United States Patent [19]

Mack, Jr.

[11] Patent Number: 4,869,084
[45] Date of Patent: Sep. 26, 1989

[54] AUTOMOTIVE VEHICLE WHEEL COVER LOCK

[76] Inventor: Ernest Mack, Jr., 8111 Warren Blvd., Centerline, Mich. 48015

[21] Appl. No.: 283,579

[22] Filed: Dec. 14, 1988

[51] Int. Cl.$^4$ ............................................. E05B 65/12
[52] U.S. Cl. ...................................... 70/259; 70/164; 70/18; 301/37 AT
[58] Field of Search ................. 70/259, 260, 258, 158, 70/163–173, 18; 301/37 AT; 24/115 R, 115 M, 135 R

[56] References Cited

U.S. PATENT DOCUMENTS

| | | | |
|---|---|---|---|
| 1,520,902 | 12/1924 | Junkunc | 70/18 |
| 4,055,973 | 11/1977 | Best | 70/18 |
| 4,116,490 | 9/1978 | Huff | 70/163 |
| 4,171,851 | 10/1979 | Scruggs | 301/37 AT |
| 4,193,640 | 3/1980 | Jones | 301/37 AT |
| 4,280,348 | 7/1981 | Teston | 70/166 |

Primary Examiner—Robert L. Wolfe
Attorney, Agent, or Firm—Malcolm R. McKinnon

[57] ABSTRACT

An improved automotive vehicle wheel cover lock for releasably anchoring a wheel cover to a wheel lug stud, the improved wheel cover lock including a flexible cable having an annular terminal defining an opening adapted to receive the wheel lug stud. A locking housing is provided which defines an axially extending bore open at each end and having an internally threaded section at one end thereof and an enlarged section at the opposite end thereof. In addition, the housing defines a pair of aligned passageways which communicate with the enlarged section of the bore and are adapted to receive the cable, and a locking screw is provided which threadably engages the internally threaded section of the body and bears against the cable to deflect the cable within the elastic limits thereof into locking engagement with the edge portions of the housing that define the aligned passageways.

8 Claims, 2 Drawing Sheets

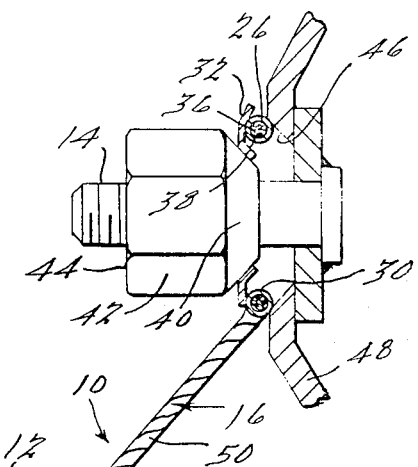
Fig. 2.
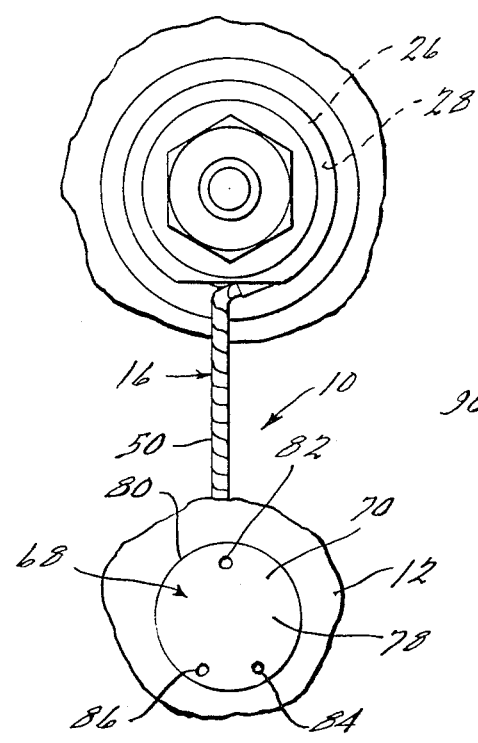
Fig. 1.
Fig. 3.
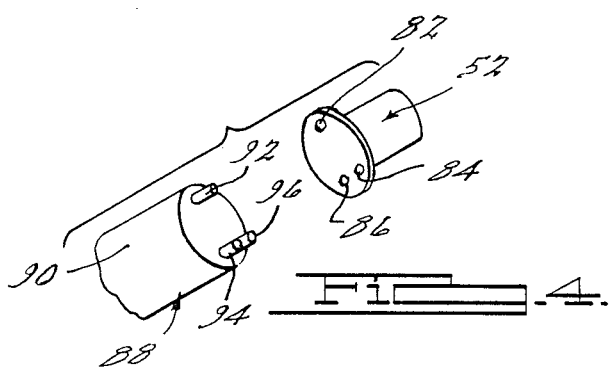
Fig. 4.
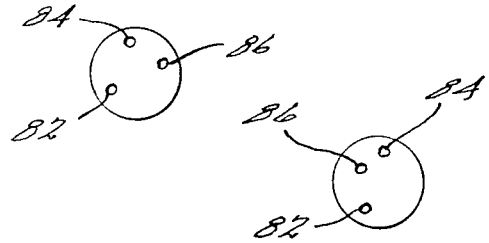
Fig. 5.
Fig. 6.

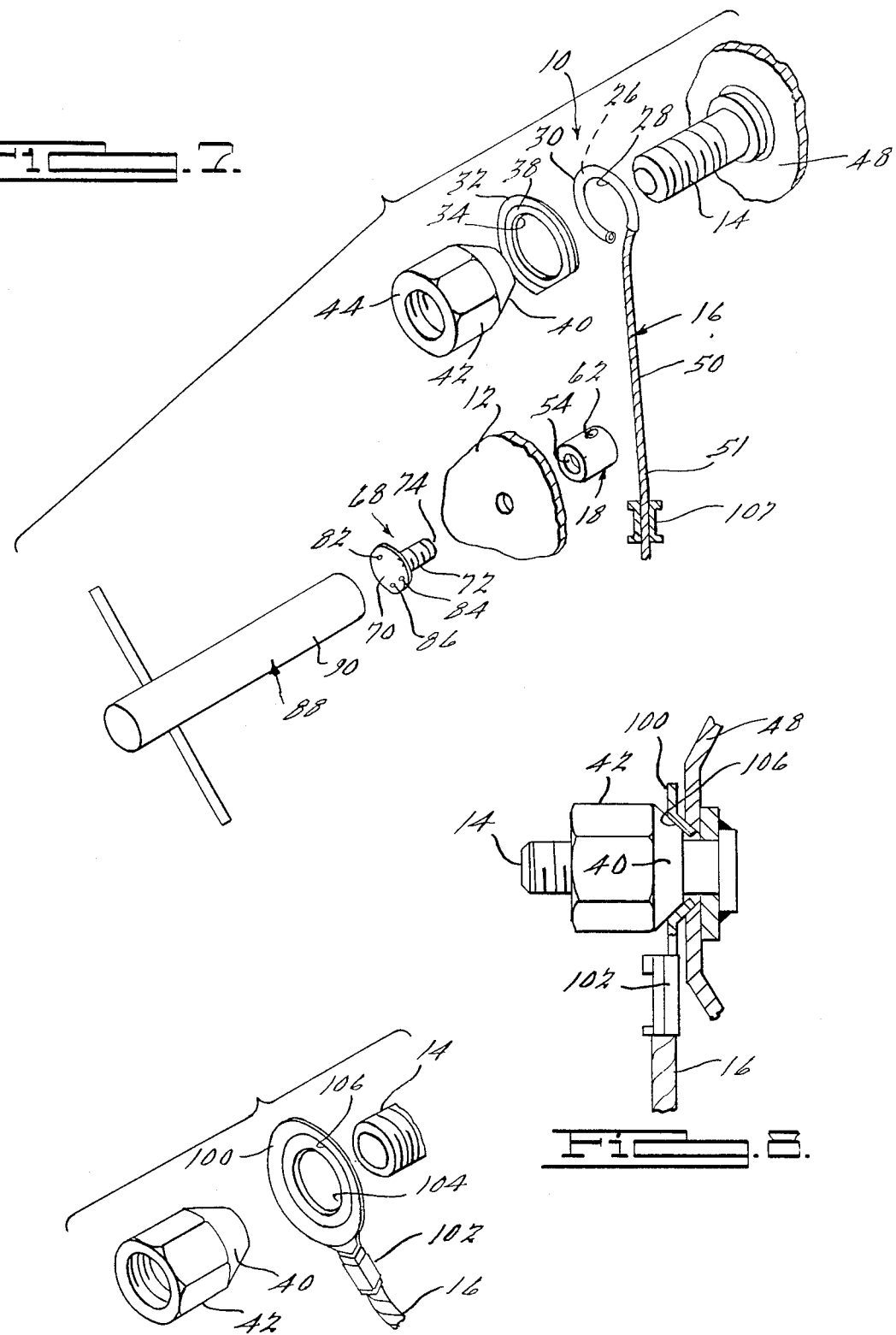

AUTOMOTIVE VEHICLE WHEEL COVER LOCK

BRIEF SUMMARY OF THE INVENTION

This invention relates to automotive vehicle wheel cover locks and, more particularly, to an improved automotive vehicle wheel cover lock incorporating an improved locking device and effective to lock a wheel cover to a wheel in order to deter the theft of wheel covers, wheels and tires, and to provide improved protection against loss of wheel covers due to various road hazards.

Automotive vehicle wheel covers, such as automobile wheel covers, are usually supplied on automobiles and other automotive vehicles by the manufacturers thereof for decorative purposes as well as for the purpose of covering and providing protection for the wheel hub, the lug studs, the lug nuts and the center disc or spider of the wheel. As is well known in the art, wheel covers supplied by the vehicle manufacturers normally fit resiliently against the wheel rim and are intended to be easily removable, for example for tire changing purposes, by a screw driver blade, a tire iron or other suitable tools. Since the wheel covers conventionally supplied on modern day vehicles are relativley expensive, such wheel covers have become the object of widespread theft in that all four wheel covers, when not locked on an automobile, for example, can be stolen by a thief in a matter of seconds. The theft of wheels ard tires has also become widespread since removal of the wheel covers provides ready access to the wheel stud nuts. Moreover, it is well known that chuck holes, rocks and other road hazards can effect sufficient deflection of a wheel rim on a moving vehicle to cause a wheel cover to pop off the wheel, often without the knowledge of the vehicle driver, or under heavy traffic conditions, such as on a freeway, which prevents a driven from retrieving the wheel cover even if the driver is aware of the fact that the wheel cover has separated from the wheel.

Heretofor, various devices have been provided for the purpose of locking a wheel cover to a wheel. U.S. Pat. No. 4,280,348 issued July 28, 1981 to Richard E. Teston discloses and claims an automotive vehicle wheel cover locking means which has enjoyed commercial success, and the present invention constitutes an improvement upon the automotive vehicle wheel cover locking means disclosed in U.S. Pat. No. 4,280,348.

An object of the present invention is to provide an improved automotive vehicle wheel cover lock incorporating improved means for securing a wheel cover to a wheel to deter the theft of wheel covers, wheels and tires, and to provide protection against the accidental loss of wheel covers due to various road hazards.

Another object of the present invention is to provide an improved automotive vehicle wheel cover lock incorporating improved locking means for tightly securing a wheel cover to a wheel with a minimum of time and labor.

Another object of the present invention is to provide an improved automotive vehicle wheel cover lock which is not only tamper resistant but which can be easily and quickly installed on and/or removed from a wheel cover by an authorized user of a vehicle.

Another object of the present invention is to provide an improved automotive vehicle wheel cover lock which may be readily customized for substantially the sole use of an authorized user of a vehicle and which incorporates improved clamping means for releasably locking a wheel cover to a wheel stud through the agency of a flexible cable.

Another object of the present invention is to provide an improved automotive vehicle wheel cover lock that is unobtrusive and unobjectionable from an appearance standpoint.

Another object of the present invention is to provide an improved automotive vehicle wheel cover lock that is economical to manufacture and assemble, durable, efficient and reliable in operation.

Still another object of the present invention is to provide an improved locking device for use with flexible cables.

The above as well as other objects and advantages of the present invention will become apparent from the following description, the appended claims and the accompanying drawings.

BRIEF DESCRIPTION OF THE DRAWINGS

FIG. 1 is a perspective view of a wheel cover lock embodying the present invention, showing the same installed on an automotive vehicle wheel cover;

FIG. 2 is an enlarged, sectional elevational view of a portion of the structure illustrated in FIG. 1;

FIG. 3 is a front elevational view, with portions broken away, of the wheel cover lock illustrated in FIG. 2;

FIG. 4 is a perspective view of a customized locking member embodying the present invention and a customized wrench for use with such locking member;

FIG. 5 is a front elevational view of the locking member illustrated in FIG. 4;

FIG. 6 is a front elevational view of a locking member illustrating the manner by which the locking member may be customized with a different wrench pattern;

FIG. 7 is an exploded perspective view of the wheel cover lock illustrated in FIG. 2, showing the same in conjunction with a lug stud and lug nut and a customized wrench;

FIG. 8 is a sectional elevational view of another embodiment of the invention; and FIG. 9 is an exploded perspective view of the embodiment of the invention illustrated in FIG. 8, showing the same in conjunction with a lug stud and a lug nut.

DETAILED DESCRIPTION

Referring to the drawings, a preferred embodiment of the invention is illustrated in FIGS. 1–7 thereof, and is comprised of a wheel cover lock, generally designated 10, which is intended for use inreleasably anchoring an automotive wheel cover 12 to a wheel lug stud 14 for the purpose of detering the theft of the wheel cover and the associated wheel and tire, and to provide protection against the loss of the wheel cover due to various road hazards. However, it will be understood that the present invention is also applicable to other uses. The wheel cover lock 10 is comprised of a locking cable, generally designated 16, and a customized locking member, generally designated 18, which cooperates with the locking cable 16 to releasably lock the wheel cover 12 to the conventional lug stud 14. As shown in FIG. 1, the locking member 18 is preferably installed on the wheel cover 12 at a position between the center 20 of the wheel cover and the rim 22 of the wheel cover and is also preferably disposed in the general are aof the wheel cover which is approximately diametrically opposed and remote from the conventinal valve stem 24.

The locking cable 16 is preferably fabricated from stainless steel or other corrosive resistant material having sufficient strength to withstand the forces that may be exerted thereon. It is also preferred that the locking cable 16 be relatively flexible and have a sufficiently high elastic limit so that it will not be permanently deformed when the locking member 18 is locked thereto as will be described hereinafter in greater detail. As shown in the drawings, the locking cable 16 includes an annular portion 26 of generally split ring configuration. The flexible resilient cable 16 is maintained in the generally split ring configuration through the agency of a tubular constraining member 30 which is initially slipped over the cable 16 and then permanently deformed into the generally circular, split ring configuration illustrated in the drawings so as to maintain the flexible cable in a split ring configuration to define a generally circular opening 28 adapted to receive the conventional externally threaded lug stud 14. In this embodiment of the invention, a dished washer 32 is provided that defines a genreally circular opening 34 also adapted to receive the conventional externally threaded lug stud 14, the washer 32 defining a groove 36 on one side thereof adapted to receive the tubular constraining member 30 and also having a tapered surface 38 on the other side thereof adapted to receive the tapered end portion 40 of a conventional lug nut 42. As is well known in the art, conventional lug nuts have the tapered end portion 40 at one end thereof and a substantially flat surface 44 at the opposite end thereof, the tapered end portion 40 being adapted to fit in a tapered recess 46 surrounding the lug stud opening provided in the wheeel 48 when the lug nut 42 is utilized in a conventional manner. The washer 32 serves to increase the area of contact between the lug nut 42 and the washer 32 and between the washer 32 and the constraining member 30 with the result that large area contact, as distinguished from line contact, is provided between the lug nut 42 and the washer 32 and between the washer 32 and the constraining member 30 that is circumposed on the cable 16.

The cable 16 also includes an elongate leg portion 50 which extends outwardly at an angle of approximately 45 degrees toward the wheel cover 12, the free end portion 51 of the locking cable 16 being adapted to be received in the locking member 18 as will be described hereinafter in greater detail.

The locking member 18 includes a housing 52 which defines an axially extending bore 54 that is open at each end, the bore 54 having a first section 56 that is internally threaded and a second section 58 that is unthreaded and larger in diameter than the threaded section 56, the second section 58 terminating at a radially extending shoulder 60. The housing 52 also includes aligned openings 62 and 64 in the wall 66 of the housing defining the second section 58 of the bore 54, the axes of the openings 62 and 64 preferably extending at right angles to the axis of the bore 54 and being adapted to receive the free end portion 51 of the cable 16 with an easy sliding fit. The internally threaded section 56 of the housing is adapted to threadably engage an externally threaded locking screw 68 having a circular head portion 70 and an externally threaded shank portion 72 termination in a flat end surface 74. The housing 52 and the locking screw 68 are also preferably formed of stainless steel or other corrosion resistant material having sufficient strength to withstand the forces that may be exterted thereon. The locking screw 68 includes the circular head portion 70 having a flat surface 76 adapted to abut the outer surface 77 of the wheel cover, and a convex outer surface 78 which blends with the flat surface 76 at the periphery of the head with a substantially feather edge 80. The head portion 70 of the locking screw 68 is provided with a plurality of spaced passageways 82, 84 and 86 as shown, for example, in FIGS. 3, 4, 5 and 6. In the preferred embodiment of the invention illustrated, three passageways are provided although it will be understood that greater or lesser number of passageways may be utilized if desired. The passageways 82, 84 and 86 are disposed in a predetermined pattern, which pattern is randomly varied for different vehicles. A T-handled customized wrench 88 is provided for installing the locking screw 68 on and removing the locking screw from the housing 52, the customized wrench including a body portion 90 carrying three axially extending pins 92, 94 and 96 so arranged that the pins may be precisely aligned with and inserted in the spaced passageways 82, 84 and 96 provided in the head portion 70 of the locking screw 68 as illustrated in FIGS. 4 and 7. It will be understood that the wheel cover locks 10 for a particular vehicle will preferably be provided with, for example, four locking members 18 each having the same configuration of spaced passageways in the locking screw head and with a customized wrench carrying pins arranged in the configuration corresponding with the configuration of passageways in the associated locking screw head. It will also be understood that the pattern of the passageways 82, 84 and 86 and the associated pins 82, 94 and 96 on the customized wrench 88 will vary from vehicle to vehicle so that a single wrench can be used only with its associated locking members and will not fit the locking members with a different passageway pattern installed on other vehicles, as illustrated in FIG. 6.

In the installation of the wheel cover lock 10, the wheel cover 12 is initially removed from the wheel rim, and one of the conventional lug nuts 42 which serves to secure the wheel to the brake drum through the agency of the associated lug stud is removed. After the selected lug nut is removed from the associated lug stud, the constraining member 30 including the split ring configuration of the locking cable confined within the constraining member 30 is then circumposed on the lug stud, the dished washer 32 is placed over the constraining member 30 and clamped in place between the tapered end portion 40 of the lug nut and the wheel. In other words, the tapered end portion 40 of the lug nut bears against the washer 32, the washer 32 bears against the constraining member 30 and the constraining member 30 bears against the wheel so as to clamp the cable on the lug stud between the lug nut and the wheel.

The locking screw 68 is then inserted through an opening in the wheel cover and threaded into the internally threaded section 56 of the bore 54 of the housing 52, the housing 52 being disposed adjacent the inside surface of the wheel cover. The free end portion 51 of the flexible locking cable 16 is then passed through the aligned openings 62 and 64 in the wall 66 of the housing 52. If desried, after the free end portion 51 of the flexible locking cable 16 has been passed through the aligned openings 62 and 64 in the wall 66 of the housing 52, a ferrule-like stop member 107 may be crimped on the free end portion 51 of the cable 16 as shown in FIG. 7 to prevent the locking member 18 from sliding off the end of the cable. The wheel cover is then moved toward the wheel. As the wheel cover moves toward the wheel, the cable 16 slides through the openings 62 and 64 in the housing 52 so that the length of the cable between the constraining member 30 and the housing 52 decreases to a minimum. After the wheel cover has been fully installed by forcing it into resilient frictional engagement with the wheel, the end surface 74 of the locking screw 68 is forced against the portion of the cable disposed within the unthreaded second section 58 of the bore 54 of the housing through the agency of the wrench 88. As the locking screw 68 is tightened against the flexible cable 16, the flexible cable is deformed, within its elastic limits, as it is forced into frictional locking engagement with the edges of the wall of the housing defining the openings 62 nad 64 so as to securely lock the cable 16 to the housing 52. However, deformation of the cable 16 into the locking position is not in excess of the elastic limit of the cable so that the cable returns to its initial straight condition upon retraction of the locking screw 68. Therefore, the locking cable is releasably locked in position as illustrated in FIG. 2, but the cable will slide freely through the openings 62 and 64 in the housing wall when the locking screw is retracted. It will be understood that the locking screw 68 is tightened in the housing 52 through the agency of the customized wrench 68 by inserting the pins 92, 94 and 96 of the wrench in the passageways 82, 84 and 86 provided in the head of the locking screw and thereafter applying torque to the wrench so as to tighten the flat surface of the head of the locking screw against the outer surface of the wheel cover. The head of the locking screw may have, for example, a diameter of approximatley ⅛ inch and a thickness of approximately ⅛ inch, and it will be understood that as a result of the combination of the feathered edge 80 at the periphery of the head of the locking screw and the predetermined pattern of the spaced passageways provided on the head of the locking screw, that the head of the locking screw will be nearly flush with the outer surface of the wheel cover and difficult to remove using conventional tools such as pliers, screwdrivers and the like. At the same time, since the head of the locking screw is relatively small, it is unobtrusive when installed on a wheel cover and does not detract from the general appearance of the wheel cover while protecting against the theft of the wheel cover or the loss of the wheel cover due to hazardous road conditions.

Another embodiment of the invention is illustrated in FIGS. 8 and 9. In this embodiment of the invention, a generally dish shaped annular ring 100 is provided adapted to receive the tapered end portion 40 of a lug nut 42, the ring 100 having an outwardly projecting tang portion 102 which is fixed to the adjacent end portion of the cable 16 by crimping the tang portion 102 around the cable. The annular ring 100 defines an opening 104 adapted to receive the lug stud 14 while the tapered surface 40 of the lug nut is adapted to bear against the tapered surface 106 of the annular ring as illustrated in FIG. 8. In all other respects, the structure, manner of installation and results obtained by this embodiment of the invention are the same as the structure, manner of installation and results obtained by the embodiment of the invention as illustrated in FIGS. 1–7. If desired, the stop member 107, previously described, may also be utilized in conjunction with this embodiment of the invention.

From the forgoing, it will be apparent that the installation of wheel cover locks embodying the present invention does not require the removal of the wheel assembly from the vehicle nor hoisting of the vehicle, and does not require the use of expensive tools or that the user be possessed of exceptional mechanical ability.

While preferred embodiments of the invention have been illustrated and described, it will be understood that various changes and modifications may be made without departing from the spirit of the invention.

What is claimed is:

1. An automotive vehicle wheel cover lock comprising, in combination, a flexible cable having an annular terminal defining an opening adapted to receive a conventional wheel lug stud, said flexible cable including a free end portion projecting outwardly from said terminal, a locking housing having a tubular body defining a bore open at each end, said bore including an internally threaded section at one end thereof and an enlarged section at the opposite end thereof, said tubular body also defining aligned passageways communicating with said enlarged section of said bore and adapted to receive said free end portion of said cable with a sliding fit, a locking screw including an integral head having an inner surface adapted to abut the outer surface of a wheel cover and a convex outer surface blending smoothly with said inner surface at the periphery of said head, said locking screw also including an externally threaded shank adapted to threadably engage said internally threaded section of said bore, the end of said locking screw remote from said head being adapted to bear against a portion of said cable disposed within said enlarged section of the bore of said body and deflect said cable into locking engagement with the edges of said body defining said aligned passageways.

2. The combination as set forth in claim 1, said annular terminal including a constraining member circumposed on said cable.

3. The combination as set forth in claim 1, said annular terminal including a generally dish shaped ring fixed to said cable.

4. The combination as set forth in claim 1, said head of said locking screw defining drive means intersecting said convex outer surface in a predetermined pattern.

5. In combination with an automotive vehicle wheel cover having an outer wall defining an opening, locking means for releasably anchoring said wheel cover to a wheel lug stud, said locking means including a flexible cable having annular terminal means defining an opening adapted to receive said wheel lug stud, said locking cable also including an integral leg having a free end portion, a locking housing having a tubular body defining an axially extending bore open at each end, said bore including an internally threaded section at one end thereof and an enlarged section at the opposite end thereof, said body defining a pair of aligned passageways communicating with said enlarged section of said bore and adapted to receive said free end portion of said cable, and a locking screw including an integral head having a flat surface adapted to abut the outer surface of said outer wall of said wheel cover and a convex outer surface blending smoothly with said flat surface at the periphery of said head, said locking screw also including an externally threaded shank extended through the opening in the outer wall of said wheel cover and threadably engaging said internally threaded section of said bore, said locking screw having an end surface remote from said head adapted to bear against a portion of said cable disposed within said enlarged section of said bore and to deflect said cable within the elastic limits thereof into locking engagement with the edge portions of said body defining said aligned passageways.

6. The combination as set forth in claim 5, said annular terminal means being of split ring configuration and including constraining means effective to maintain a portion of said cable in a split ring configuration.

7. The combination as set forth in claim 5, said annular terminal means including a generally dish shaped ring fixed to the adjacent end portion of said cable.

8. A locking device for use with a flexible cable, said locking device including, in combination, a housing having a tubular body defining a bore open at each end, said bore including an internally threaded section at one end thereof and an enlarged section at the opposite end thereof, said body also defining aligned passageways communicating with said enlarged section of said bore and adapted to receive said cable with a sliding fit, a locking screw including an integral head and an externally threaded shank adapted to threadably engage said internally threaded section of said bore, the end of said locking screw remote from said head being adapted to bear against a portion of said cable disposed within said enlarged section of the bore of said body and deflect said cable into locking engagement with the edges of said body defining said aligned passageways.

* * * * *